(12) United States Patent  
Sofer et al.

(10) Patent No.: US 11,757,837 B2  
(45) Date of Patent: Sep. 12, 2023

(54) SENSITIVE DATA IDENTIFICATION IN REAL TIME FOR DATA STREAMING

(71) Applicant: International Business Machines Corporation, Armonk, NY (US)

(72) Inventors: Oded Sofer, Midreshet Ben Gurion (IL); Ofer Haim Biller, Midreshet Ben Gurion (IL)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 16/856,208

(22) Filed: Apr. 23, 2020

(65) Prior Publication Data

US 2021/0336928 A1 Oct. 28, 2021

(51) Int. Cl.
*H04L 9/40* (2022.01)
*G06F 21/62* (2013.01)

(52) U.S. Cl.
CPC ...... *H04L 63/0245* (2013.01); *G06F 21/6245* (2013.01)

(58) Field of Classification Search
CPC ............. H04L 63/0245; H04L 63/0281; G06F 21/6245; G06F 21/6263
See application file for complete search history.

(56) References Cited

U.S. PATENT DOCUMENTS

| | | | |
|---|---|---|---|
| 8,565,108 B1 * | 10/2013 | Marshall | H04L 63/0227 709/224 |
| 8,635,691 B2 * | 1/2014 | Vogel | G06F 21/6245 726/22 |
| 8,688,601 B2 * | 4/2014 | Jaiswal | G06N 20/00 706/12 |
| 9,094,288 B1 * | 7/2015 | Nucci | H04L 43/026 |
| 9,324,022 B2 * | 4/2016 | Williams, Jr. | G06N 3/045 |
| 9,413,783 B1 * | 8/2016 | Keogh | H04L 63/1458 |
| 10,417,441 B2 | 9/2019 | Rodlansky | |

(Continued)

FOREIGN PATENT DOCUMENTS

CN 104866770 A 11/2014

OTHER PUBLICATIONS

"Secure the data that powers your business", IBM, Produced in the United States of America Jun. 2017, WGS03063-USEN-02, 6 pages.

(Continued)

*Primary Examiner* — Farid Homayounmehr
*Assistant Examiner* — Mudasiru K Olaegbe
(74) *Attorney, Agent, or Firm* — Brandon L. Stephens; Christopher M. Pignato

(57) ABSTRACT

A computer-based system and method for classifying data in real-time for data streaming may include: capturing a plurality of data packets flowing between a data source machine and a data client; searching at least one of the data packets for tokens associated with sensitive information; if tokens associated with sensitive information are not found in a data packet: allowing the data packet to flow between the data source machine and the data client; and sending the data packet to a comprehensive security analysis; and if tokens associated with sensitive information are found in the data packet: preventing the data packet form flowing between the data source machine and the data client; and sending the data packet to a comprehensive security analysis.

18 Claims, 6 Drawing Sheets

(56) References Cited

U.S. PATENT DOCUMENTS

| | | | |
|---|---|---|---|
| 2006/0048224 A1 | 3/2006 | Duncan et al. | |
| 2006/0136570 A1* | 6/2006 | Pandya | G06F 9/30036 709/217 |
| 2007/0169184 A1* | 7/2007 | Krywaniuk | H04L 63/0254 726/13 |
| 2008/0216174 A1* | 9/2008 | Vogel | G06F 21/6245 726/22 |
| 2008/0262991 A1* | 10/2008 | Kapoor | H04L 63/1441 706/20 |
| 2010/0125900 A1* | 5/2010 | Dennerline | H04L 63/0227 726/13 |
| 2011/0145920 A1* | 6/2011 | Mahaffey | H04W 12/12 726/22 |
| 2016/0099963 A1* | 4/2016 | Mahaffey | G06F 21/554 726/25 |
| 2017/0099200 A1* | 4/2017 | Ellenbogen | G06V 10/764 |
| 2017/0104756 A1 | 4/2017 | Rosenthal et al. | |
| 2017/0140174 A1* | 5/2017 | Lacey | G06Q 20/4016 |
| 2017/0185638 A1* | 6/2017 | Aoki | G06F 21/62 |
| 2017/0270310 A1 | 9/2017 | Becker et al. | |
| 2019/0095808 A1* | 3/2019 | Chattopadhyay | G06Q 10/0635 |
| 2019/0347413 A1* | 11/2019 | Dubrovsky | G06F 21/561 |
| 2020/0067861 A1* | 2/2020 | Leddy | G06F 21/6245 |

OTHER PUBLICATIONS

Well et al., "The NIST Definition of Cloud Computing", Recommendations of the National Institute of Standards and Technology, Special Publication 800-145, Sep. 2011, 7 pages.

Yang et al., "Automated identification of sensitive data from implicit user specification", Cybersecurity, (2018) 1:13, 15 pages, https://doi.org/s42400-018-0011-x.

* cited by examiner

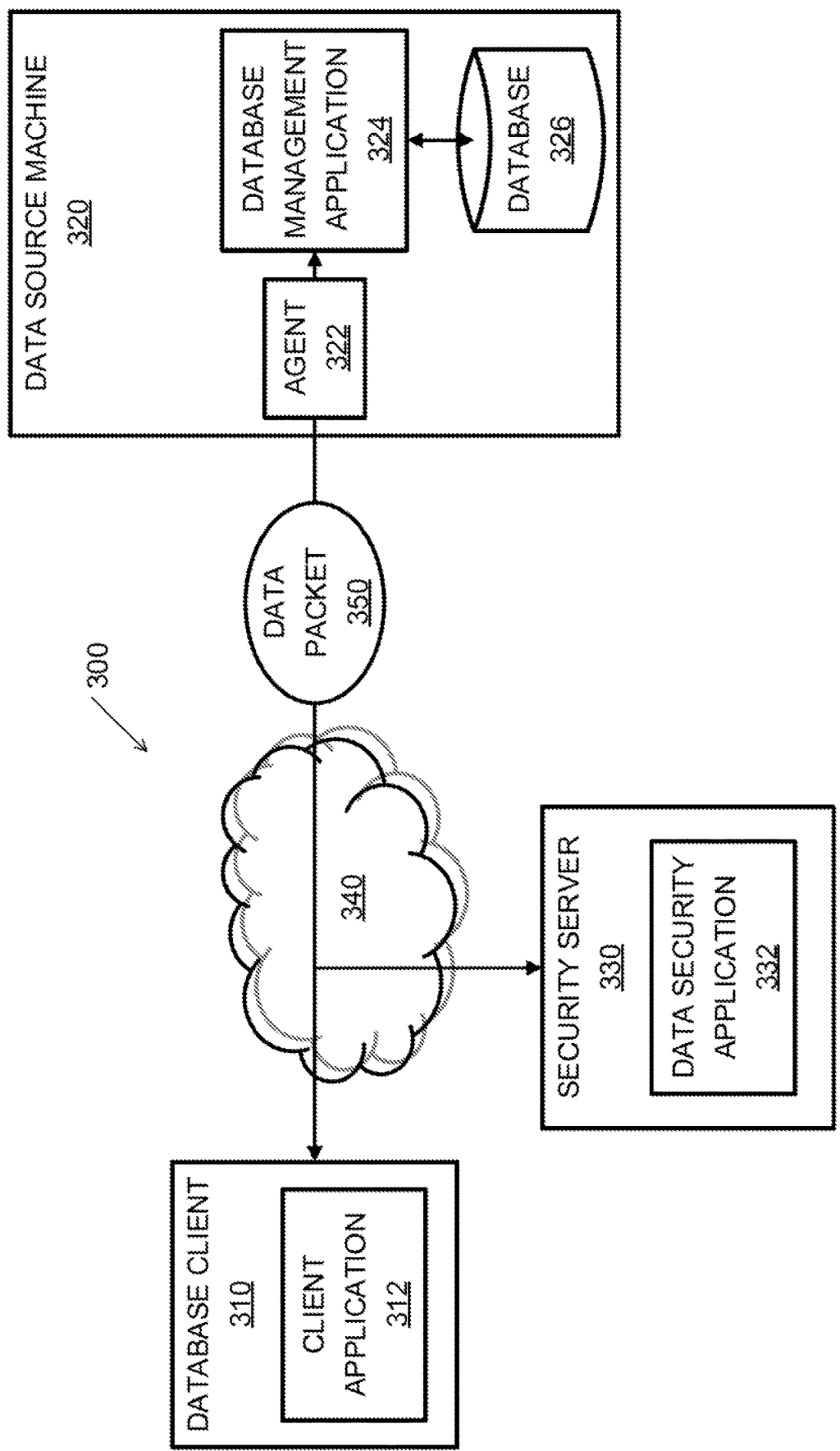

SENSITIVE DATA IDENTIFICATION IN REAL TIME FOR DATA STREAMING

FIELD OF THE INVENTION

The present invention relates generally to identifying sensitive data in real-time for data streaming, and specifically, to identifying sensitive data in database queries and responses.

BACKGROUND

Identifying and protecting sensitive data is critical for data protection and for meeting regulation requirements (general data protection regulation (GDPR), the California consumer privacy act (CCPA), the health insurance portability and accountability act (HIPAA), payment card industry data security standard (PCI DSS), Sarbanes-Oxley Act (SOX), Iso27000, Etc.). A data firewall, for example Guardium®, may provide automated discovery and classification of sensitive data, data activity monitoring and discovery of unusual activity around sensitive data. The data firewall may protect against unauthorized data access by learning regular user access patterns and can provide alerts on suspicious activities.

The data firewall typically captures or sniffs data accesses to a database (e.g., requests and responses) in real-time and analyzes the data according to policy rules to identify sensitive data. The data firewall may include a data activity monitor (DAM) and/or file activity monitor (FAM). The requests and responses sniffed by the data firewall may include data packets that may include a query, e.g., a structured query language (SQL) requests, or a response, and associated header information. The header may include metadata such as machine information, network information, user information, client information, etc.

The classification of data may be performed by parsing the captured data packets, extracting the mapping between the metadata and data (e.g., field name for every value), running a rule engine against the metadata and then scanning the data itself to identify sensitive data. Currently, DAM and FAM products are classifying the captured data offline due to the complexity and performance requirements of the classification process. However, using the classifier in offline mode may be too late for preventing data breach or data tampering.

Therefore, a method for online classification and identification of sensitive data for data streaming is required.

SUMMARY

According to embodiments of the invention, a system and method for classifying data in real-time may include: capturing a plurality of data packets flowing between a data source machine and a data client; searching at least one of the data packets for tokens associated with sensitive information; if tokens associated with sensitive information are not found in a data packet: allowing the data packet to flow between the data source machine and the data client; and sending the data packet to a comprehensive security analysis, and if tokens associated with sensitive information are found in the data packet: preventing the data packet form flowing between the data source machine and the data client; sending the data packet to a comprehensive security analysis.

Furthermore, if tokens associated with sensitive information are found in the data packet, embodiments of the invention may include continuing to prevent the data packet from flowing between the data source machine and the data client if the comprehensive security analysis finds security issues: and allowing the data packet to flow between the data source machine and the data client if the comprehensive security analysis finds no security issues.

According to embodiments of the invention, the data source machine may be selected from: a database server, a file server, a proxy and a database server, a combination of a proxy and a file server, a combination of a network gate and a database server, and a combination of a network gate and a file server.

According to embodiments of the invention, the data packet may be one of: a query sent from the data client to the data source machine, and a response sent from the data source machine to the data client.

According to embodiments of the invention, capturing and searching may be performed by a software agent that is installed on the data source machine.

According to embodiments of the invention, performing a comprehensive security analysis may be performed by a dedicated security server, and wherein the data packet is sent to the dedicated security server for performing the comprehensive security analysis.

According to embodiments of the invention, searching the data packet for tokens associated with sensitive information may include at least one of: wildcard search, pattern search and dictionary search.

Embodiments of the invention may include updating the tokens associated with sensitive information based on results of the comprehensive security analysis.

According to embodiments of the invention, the comprehensive security analysis may include: parsing the data packet; mapping metadata to data; building hierarchy of the data; and processing policy rules.

Embodiments of the invention may include issuing a security alert if tokens associated with sensitive information are found in the data packet and if the comprehensive security analysis finds security issues.

Embodiments of the invention may include: after capturing, decrypting the plurality of data packets to obtain a header of each packet; analyzing the headers to determine security status of packets associated with the headers; and selecting the at least one data packet based on the security status.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 3 depicts a system, according to embodiment of the invention;

Figure 1:
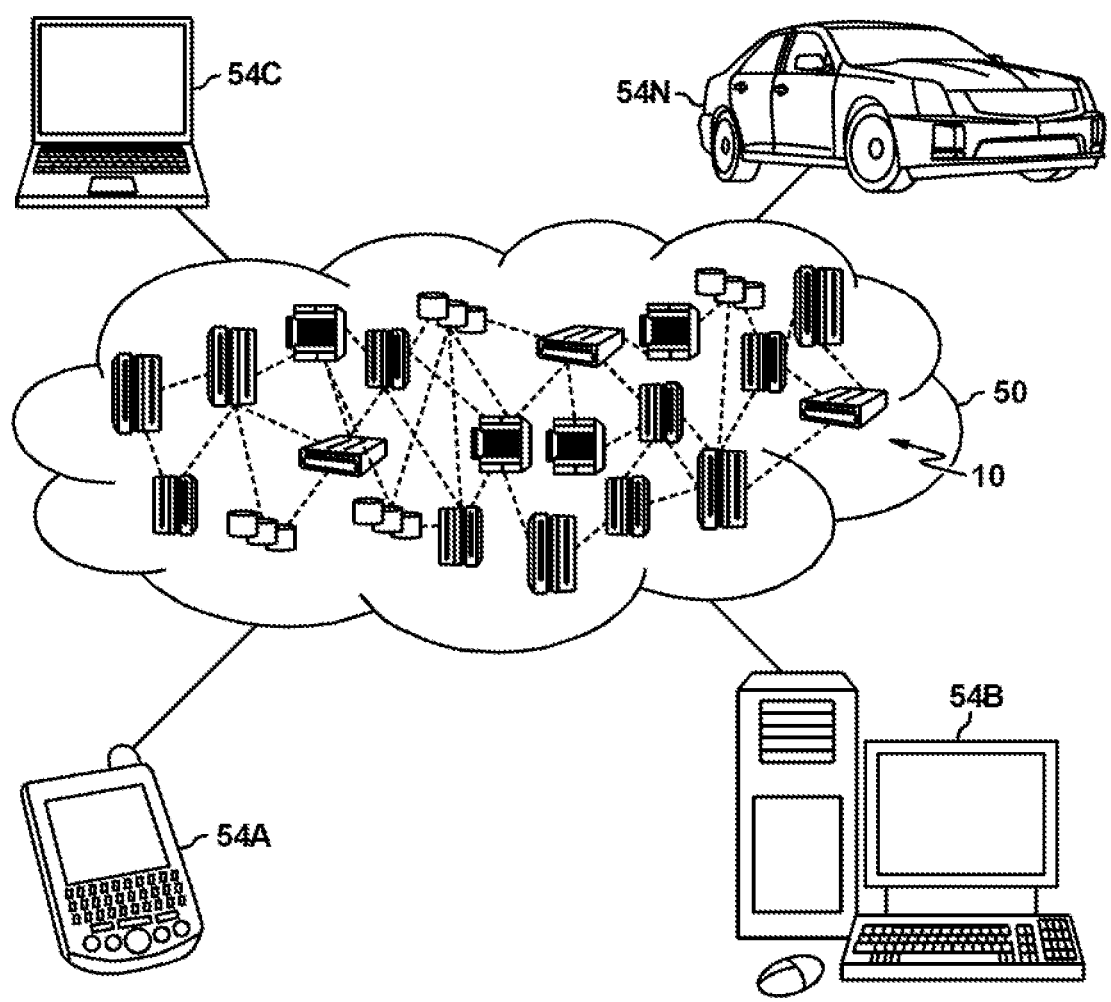
FIG. 1 depicts a cloud computing environment according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Example cloud model may include for example five characteristics, at least three service models, and at least four deployment models.

Characteristics may be for example:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models may be for example:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database-as-a-Service (DBaaS): the capability provided to the consumer is to store data on a cloud infrastructure. DBaaS paradigm is a common approach for storing data in a cloud based computerized service, where users get access to data without the need for managing hardware or software.

Deployment Models may be for example:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Embodiments of the invention may provide a system and method to identify and handle sensitive data streaming in and out of a database in real-time.

Current architecture of DAM and FAM products is based on a two steps process. The first step is performed in real-time by an agent software or application which is installed on the data source machine and the second step is performed offline by a security server application, also referred to as a collector. The data source machine may include a database, e.g., a database server, a file server, etc., or a combination of a database and a proxy or network gate of the database. The agent software may be installed on the database itself or on the proxy or network gate of the database. Installing the agent software on a proxy or network gate of a database may enable capturing data packets in cloud-based databases (when DBaaS model is used) that are many times operated by a third party that does not allow installation of software applications on its databases.

According to prior art applications, the agent application may capture all the data packets of the requests and responses of the monitored database, read the header information, perform an initial rule processing on the header information, and then send the data packet to the collector application for an offline comprehensive security analysis. The comprehensive security analysis performed by the collector may include getting the data packet from the agent, parsing the data packet, structuring the data, e.g., classifying the data and mapping the metadata to the data, building the data hierarchy, applying the policy rules on the classified data to identify sensitive data and detecting a data breach or data tampering, according to the rules matching. Thereafter, the collector may send the data for further analysis and auditing by other components.

Many of the processes of the comprehensive security analysis performed by the collector rely on the mapping and classification of the data, which is typically running offline, due to the complexity and performance requirements of the mapping and classification of the data (e.g., +100,000 transactions per second per data source). The agent must not delay the transaction and must avoid latency. Thus, if for example a data client would like to block access via external network to data defined as sensitive, then a rule for identifying access via external network to the sensitive data may depend on identifying the sensitive data in the data packet. However, identifying and classifying data is currently performed by the offline comprehensive security analysis. Thus, the collector may identify an event of access via external network to the sensitive data, and may provide an alert. However, the identification and alert may be provided after the data was accessed.

Embodiments of the invention may provide classification and identification of sensitive data for data streaming that keeps the existing performance requirements and executes in real-time for data streaming. Thus, embodiments of the invention may improve the technology of data streaming and data protection by providing a screening test, also referred to as an instant security analysis, for detecting sensitive data in real-time. The real-time screening test may include searching for search terms such as tokens, words, values, phrases, expression or patterns associated with sensitive information in the data packets. The searching for search terms associated with sensitive information may be performed on the raw data included in the data packet, without performing the complex, computationally intensive and time consuming operations of parsing the data packets, classifying the data and mapping data to metadata. Since searching for tokens associated with sensitive information may be performed on the raw data, the computational complexity of the search is relatively low (in comparison to the parsing, classifying and mapping processes). Therefore, according to embodiments of the invention, the screening test for sensitive data may be performed in real-time by searching for tokens associated with sensitive information.

Furthermore, embodiments of the invention may provide tools for temporarily or permanently blocking data packets that are suspected as containing sensitive data, in real-time and based on the screening test. Embodiments of the invention may further include performing a comprehensive security analysis on the data packets. The comprehensive security analysis may include the entire process of parsing, classifying and mapping data and running rule test. As noted, the comprehensive security analysis may be computationally intensive task and may be performed offline. However, according to embodiments of the invention, if the real-time screening test indicates that a data packet is suspected as sensitive, the data packet may be at least temporarily blocked, at least until the results of the comprehensive security analysis are known. If the results of the comprehensive security analysis indicate that indeed the suspected data packet includes sensitive data, the data packet may be permanently blocked, and an alert may be provided. If, however, the results of the comprehensive security analysis indicate that the suspected data packet does not include sensitive data (e.g., the results of the screening test were a false positive), the data packet may be released and allowed to reach its destination (allow commit).

For example, if tokens associated with sensitive information are found in the data packet, embodiments of the invention may include performing a comprehensive security analysis on the data packet, while blocking the data packet (e.g., while preventing the data packet form flowing between the data source machine and the data client) as long as the comprehensive security analysis is being performed. When the comprehensive security analysis is completed and depending on the results of the comprehensive security analysis, the data packet may be permanently blocked or allowed to reach its destination. For example, if the comprehensive security analysis finds security issues, the data packet may be permanently blocked. However, if the comprehensive security analysis finds no security issues, the blocking may be removed, and the packet may be allowed to flow between the data source machine and the data client. If tokens associated with sensitive information are not found in a data packet, a comprehensive security analysis may still be performed on the data packet offline, without blocking the data packet.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. Cloud computing environment is typically located remotely from its users. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

According to embodiments of the invention, the cloud consumers may include the DO and the data client. For example, a DO may store data in cloud computing environment 50 and a data client may retrieve data from cloud computing environment 50 using any of personal digital assistant (PDA) or cellular telephone 54A, desktop computer 54B, laptop computer 54C, automobile computer system 54N and/or any other type of computerized device.

Figure 2:
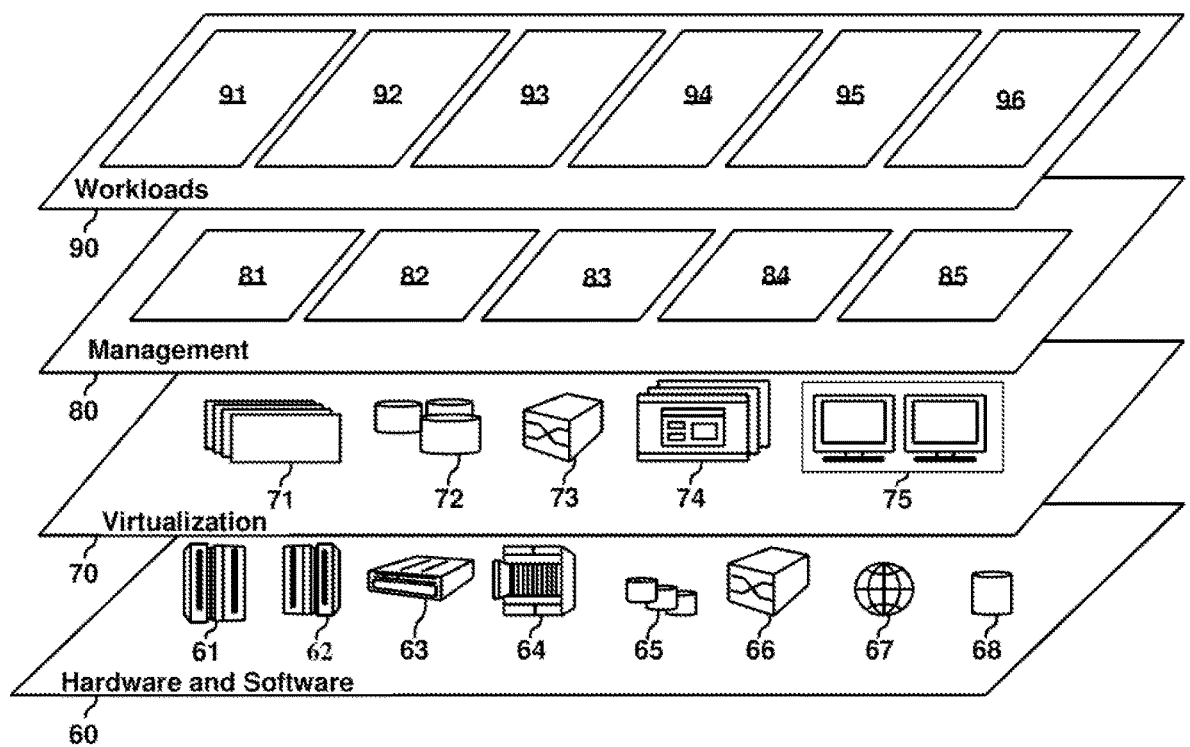
FIG. 2 depicts abstraction model layers according to an embodiment of the present invention.
Figure 6:
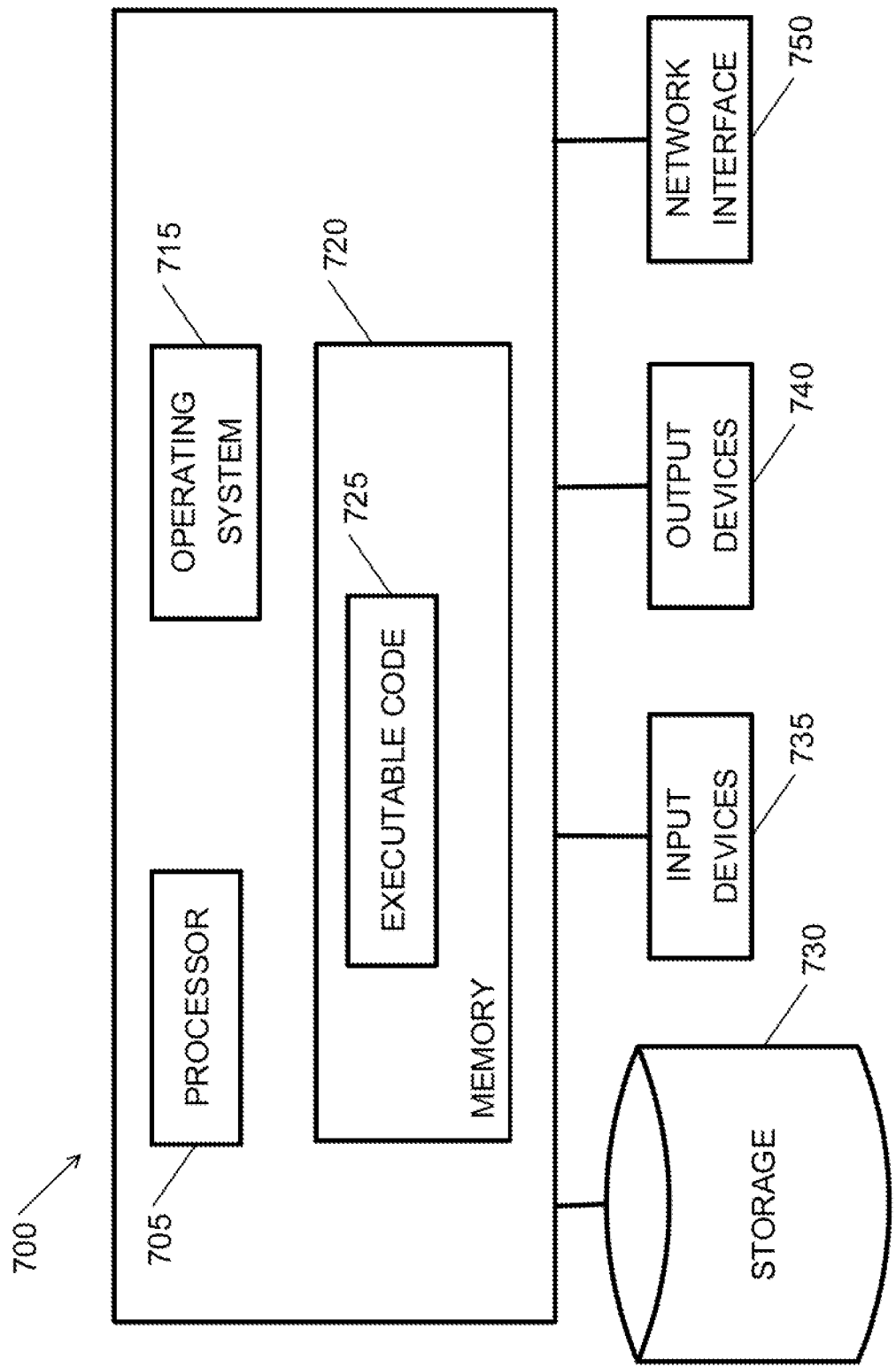
FIG. 6 illustrates an example computing device according to an embodiment of the invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components, such as the hardware and software components depicted in FIG. 6. Examples of hardware components include: processors (e.g., processor 705 depicted in FIG. 6) such as mainframes 61, RISC (Reduced Instruction Set Computer) architecture based servers 62, servers 63 and blade servers 64; storage devices 65 (e.g., storage device 730 depicted in FIG. 6); and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

According to some embodiments, a monitored database may be implemented on virtual storage 72 and physically located on storage devices 65. The database may be managed by database software 68 that may include an agent software according to embodiments of the invention. A collector or a data security application may be implemented by software running on a virtual server 71. However, other architecture and hardware may be used.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Reference is made to FIG. 3, depicting a system 300, according to embodiment of the invention. According to some embodiments, security server 330 may be implemented on a virtual server 71 and data source machine 320 may be implemented on virtual storage 72, however, other implementations may apply. It should be understood in advance that the components, and functions shown in FIG. 3 are intended to be illustrative only and embodiments of the invention are not limited thereto.

Networks 340 may include any type of network or combination of networks available for supporting communication between database client 310 data source machine 320 and security server 330. Networks 340 may include for example, a wired, wireless, fiber optic, or any other type of connection, a local area network (LAN), a wide area network (WAN), the Internet and intranet networks, etc. Additionally or alternatively, any of database client 310 data source machine 320 and security server 330 may be connected to each other directly.

According to some embodiments, a database client application 312 running on database client 310 may communicate with data source machine 320, for example, by generating and submitting database queries to data source machine 320. In one example, a query transmitted from database client 310 to data source machine 320, may be or may include one or more database protocol packets, also referred to as data packets 350 that includes a header and a payload. The header may include metadata such as machine information, network information, user information, client information, etc. The payload may include data and/or statements for a database query, e.g., SQL requests or responses. While a single database client 310 and a single data source machine 320 are shown in FIG. 3, one or more data source machines 320 may provide database services to one or more database clients 310 or client applications.

In one example, a payload of data packet 350 may include a query or a response to a query. A query may include a structured query language (SQL) query, based on a SQL statement, for accessing data in tables managed by the database management application (e.g., database management application 324, and/or database software 68). SQL represents a standardized language for defining and manipulating data in a relational database. For example, under a relational database model, the database may be perceived as a set of tables, and data may be retrieved by using SQL statements to specify a result table that can be derived from one or more tables. The query may be defined in one or more additional or alternate languages or protocols for defining and manipulating data in a relational database or in other types of databases.

Figure 4B:
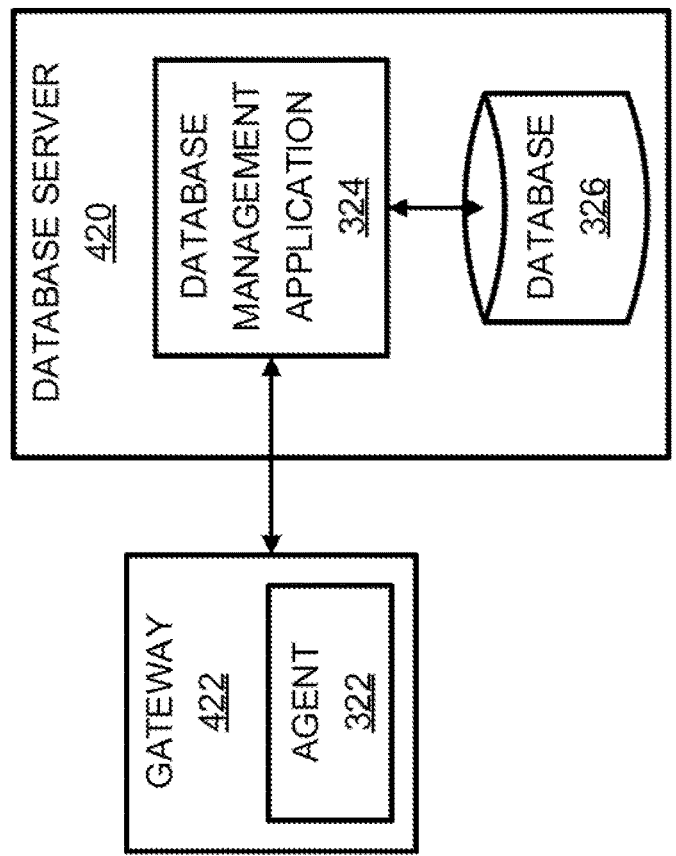
FIG. 4B depicts a data source machine that includes a combination of a gateway, a network gate or a proxy and a database server, according to embodiments of the invention.
Figure 4A:
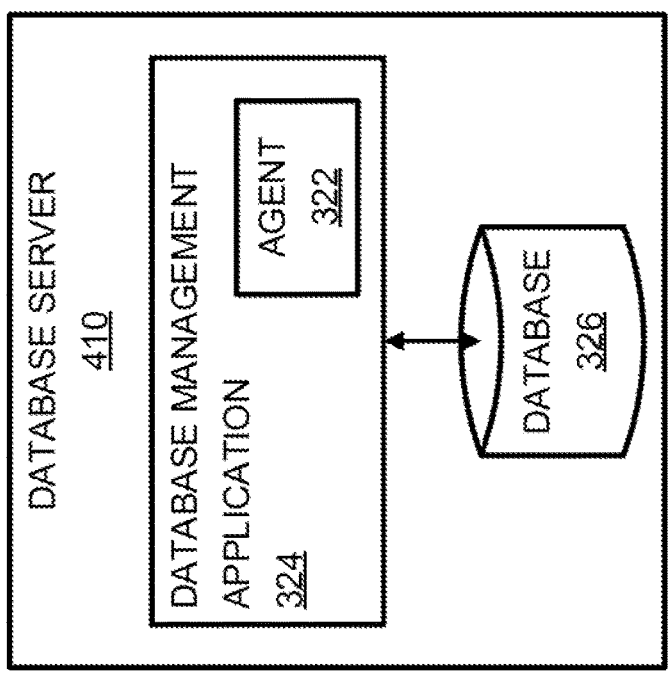
FIG. 4A depicts an example of a data source machine that includes a database server, according to embodiments of the invention.

Data source machine 320 may include a database 326, e.g., a database server, a file server, etc., or a combination of a database 326 and a proxy or network gate of the database 326, a database management application 324, and an agent application 322. An example of a data source machine that includes a database server 410 is depicted in FIG. 4A. Database server 410 may include database 326 managed by database management application 324, that may include or may communicate with an agent application 322. Similar architecture may apply to a file server. FIG. 4B depicts a data source machine that includes a combination of a gateway, a network gate or a proxy 422 and a database server (or file server) 420. Database server 420 may include a database 326 managed by database management application 324. In this embodiment, an agent application 322 is located at gateway, network gate or proxy 422.

In one example, in response to a query from database client 310, database management application 324 may handle the query and generate a response for the query that is returned to database client 310 in a database server response.

Data packets 350 may be streamed between database client 310 and data source machine 320. Agent 322 may capture, sniff or intercept one or more data packets 350 along the communication stream between database client 310 and data source machine 320, without interfering with the communication of data packets 350 to data source machine 320. Agent 322 may be implemented at one or more points along the communication stream between database client application 312 and data source machine 320 to monitor for and capture or intercept data packets 350 without requiring the participation of the database management application 432 (or database software 68), and without relying on any form of native auditing or native logs of the database management application 324. While drawn as part of data source machine 320, agent 322 may intercept database queries at other locations such as, but not limited to, the database memory of database server 410 and 420, within network 340, at the operating system level, or at the level of database libraries.

According to embodiments of the invention, agent 322 may capture or intercept a plurality of data packets 350 flowing between data source machine 320 and data client 310. Agent 322 may capture both query packets transmitted from data source machine 320 to data client 310 and response packets transmitted from data client 310 to data source machine 320. Data packets 350 may be captured in real-time substantially without adding latency or delay. According to some embodiments, agent 322 may decrypt captured data packets 350 to obtain a header of each data packet 350. Agent 322 may analyze the headers to determine security status of data packet 350 associated with the headers. For example, agent 322 may decrypt the header to obtain header information, also referred to as metadata, including, for example, machine information, network information, user information, client information, etc. Agent 322 may apply header security rules on the header data to obtain a security status of data packet 350. Agent 322 may determine based on the security status whether data packet 350 associated with the header should be blocked, should be allowed to flow without further analysis or whether further security analysis is required. For example, a header security rule may define that data packets 350 from a certain user should be blocked if a user is known as a malicious entity, should be allowed to flow without further analysis if the user is trusted, or should be further analyzed if the status of the user is not known. Other header security rules or a combination of header security rules may be used. Since the header structure is known, decrypting and analyzing the header may be performed in real-time without introducing significant delay.

According to some embodiments, agent 322 may perform an instant or rapid security analysis, also referred to as screening test on data packet 350. In some embodiments, agent 322 may perform an instant security analysis on the payload or all data packet 350 transmitted to and from data source machine 320. In some embodiments, agent 322 may perform an instant security analysis on a portion of the data packets 350 transmitted to and from data source machine 320. Agent 322 may select data packets 350 for the instant security analysis based, for example, on the security status of the data packets 350 as determined by the header analysis, e.g., if a security status is 'further analysis required'.

According to some embodiments, agent 322 may perform the instant security analysis for data packet 350 by searching at data packet 350 for search terms including, for example, tokens, values, expressions, words or phrases associated with sensitive information. The instant security analysis may include classification of data in data packet 350 to sensitive data or not sensitive data. The classification may include the following types of classification rules and search terms:

(a) Metadata wildcard search, e.g., *phone*, *Tel*, etc. where a wildcard indicates 'any value'. Thus, the header information or metadata of data packet 350 may be searched for specified search terms such as tokens, phrases, expressions or words with any value right before or after the search terms, as indicated by the wildcard. In some embodiments, if the wildcard search provides positive results, e.g., if a specified search terms with any value before or after the search terms, as indicated by the wildcard, is found in the metadata, data packet 350 may be classified as sensitive. In some embodiments, if a specified search terms with any value before or after the token, as indicated by the wildcard, is found in the metadata, this may impact, e.g., increase, a security score of data packet 350.

(b) Regular expression (a search term including a pattern, a phrase or a combination of words or tokens) search on metadata (header) or data (payload) of data packet 350. In some embodiments, if the regular expression search provides positive results, e.g., if a specified pattern is found in the metadata or data, data packet 350 may be classified as sensitive. In some embodiments, if a specified pattern is found in the metadata, this may impact, e.g., increase, a security score of data packet 350.

(c) Dictionary search, e.g., a search for search terms including specified values such as specific personal names, street names, etc. on metadata or data of data packet 350. In some embodiments, if the dictionary search provides positive results, e.g., if a specified value is found in the metadata or data, data packet 350 may be classified as sensitive. In some embodiments, if the value is found in the metadata, this may impact, e.g., increase, a security score of data packet 350.

In some embodiments, the instant security analysis may include some or all of searches a, b, and c. In some embodiments, agent 322 may run searches a, b, and c in parallel in three parallel threads. In some embodiments, agent 322 may decide whether to block data packet or allow data packet 350 to flow and reach its destination (e.g., allow commit) based on the instant security analysis. In some embodiments, if a search term associated with sensitive information is found in a data packet, agent 322 may at least temporarily block the data packet and send data packet 350 (or a copy of data packet 350) to security server 330 for a comprehensive security analysis while blocking data packet 350, e.g., while holding data packet 350 and preventing data packet 350 form flowing between data source machine 320 and data client 310.

In some embodiments, agent 322 may determine or calculate a security score of data packet 350 based on the instant security analysis, e.g., as a combination of the findings of searches a, b, and c. For example, each search term that is searched in searches a, b, and c may be associated with a weight and agent 322 may calculate the security score as a function (e.g., a sum) of the weights. Agent 322 may calculate the security score based on the results of searches a, b, and c, or other searches on data packet 350 in any applicable manner. In some embodiments, agent 322 may decide whether to block data packet 350 (permanently or temporarily while a comprehensive security analysis is being performed) or allow data packet 350 to flow and reach its destination, based on the calculated security score, e.g., agent 322 may block data packet 350 if the security score is above a threshold.

According to embodiments of the invention, the instant security analysis should be fast to enable real-time operation. e.g., the instant security analysis of a data packet 350 may take up to 1,000,000 transactions per second (TPS) with relative tiny footprint. According to embodiments of the invention, this requirement is achieved by the instant security analysis since the search is performed on the plain text of data packet 350, e.g., without knowing what value in the payload fits what field. This eliminates the need for parsing data packet 350 and therefore dramatically reduces the computational complexity with relation to a comprehensive security analysis that requires parsing of data packet 350.

According to embodiments of the invention, agent 322 may send a copy data packet 350 (e.g., mirror and send) together with the results of the instant security analysis (e.g., the search results and/or the security score) to security server 330 for a comprehensive security analysis. According to embodiments of the invention, agent 322 may send data packet 350 to security server 330 regardless of the results of the instant security test. Thus, agent 322 may determine whether to block or release data packet 350 based on the instant security test, and may send data packet 350 to security server 330 while blocking data packet 350 if the instant security test has found security issues or send data packet 350 to security server 330 while allowing data packet 350 to flow and reach its destination if the instant security test has not found security issues.

According to some embodiments of the invention, agent 322 may obtain the results of the comprehensive security analysis of data packet 350 from security server 330. According to some embodiments, if agent 322 has blocked data packet 350 and the comprehensive security analysis has found security issues, agent 322 may permanently block or discard data packet 350. If, however, no security issues are found in the comprehensive security analysis, agent 322 may stop blocking or release data packet 350 and allow data packet 350 to flow and reach its destination.

According to embodiments of the invention, agent 322 may issue a security alert if the instant security analysis has found security issues, e.g., if search terms associated with sensitive information are found in data packet 350 or if the security score is above a threshold.

Security server 330 may implement a data security application 332. Data security application 332 may be or may include a firewall, a DAM and/or a FAM, an external database non-intrusive security mechanism (EDSM), enterprise database auditing, and real-time protection. Data security application 332 may provide a database activity monitoring service of data source machine 320, including performing the comprehensive security analysis. Data security application 332 may provide continuous monitoring of database activity of data source machine 320. Examples of data security application 332 may include, but are not limited to, Guardium® available from International Business Machines Corporation.

According to embodiments of the invention, data security application 332 may obtain data packet 350 and the results of the instant security analysis performed by agent 322 from agent 322. The comprehensive security analysis may include parsing the data packet, mapping metadata to data, building hierarchy of the data (e.g., building a hierarchical-tree of name-value), and processing policy rules. Processing policy rules may require associated names and values. For example, a rule may include "if name like % ID % and value match specific regular expression (Regex)" or case of a rule that expect Zip plus Street.

According to some embodiments, data security application 332 may extract a database query or a response to a database query from the intercepted data packets 350, parse the extracted database query or response and create a security construct according to database protocol rules. The rules may include, but are not limited to, a type of operation or command identified in a query, a database object to be operated on by the operation, and a user identifier of the user requesting the query, identifiers for a service IP address, a client IP address, a client MAC, a network protocol used to access data, a database type, a service name for the name of a service providing data, a name of a database accessed, a source application used for the data access, an application user name, and operating system user, a database related field, an error code, an exception type, a service IP address of the location of data accessed, and additional or alternate rules.

According to some embodiments, data security application 332 may validate a possible database object access violation in the security construct against security policies defined by the policy rules. In one example, if the security construct does not validate against the security policies, data security application 332 may issue an alert to an administrator or other entity indicating that the intercepted data packet 350 has failed to validate against the security rules. In one example, an administrator or service may set each of the rules. According to some embodiments, the security rules may include one or more settings such as, but not limited to, an operation type setting specifying the type of operation access is or is not allowed for, an object setting specifying one or more particular database objects being acted upon by the operation, and a user setting specifying one or more user identifiers for users requesting the operation on the database object. For example, operations that may be restricted by the security rules may include operations such as, but not limited to, create, select, update and delete. The security settings may include additional or alternate types of settings.

According to embodiments of the invention, data security application 332 may enhance and adjust the classification rules used in the instant security test based on the comprehensive security analysis. For example, data security application 332 may update the list of search terms used for the classification rules, based on results of the comprehensive security analysis. For example, if agent 322 has found security issues in the instant security analysis, but data security application 332 has not found any security issues in the comprehensive security analysis, then data security application 332 may remove the search terms that invoked the security issues in the instant security analysis from the list of searched terms. However, if agent 322 has not found security issues in the instant security, but data security application 332 has found security issues in the comprehensive security analysis, then data security application 332 may add the search terms that invoked the security issues in the comprehensive security analysis to the list of searched terms. For the rules met in previous step, enhance the dictionary with the new value in FIFO mode up to certain limit. In parallel, train the model in Offline mode to create dictionary of values for all the relevant rules; The dictionaries are maintained as hash to save time and space.

Each of database client 310, security server 330 and data server 420 may be or may include a computing device such as computing device 700 depicted in FIG. 6. One or more databases 326 may be or may include a storage device such as storage device 730.

Figure 5:
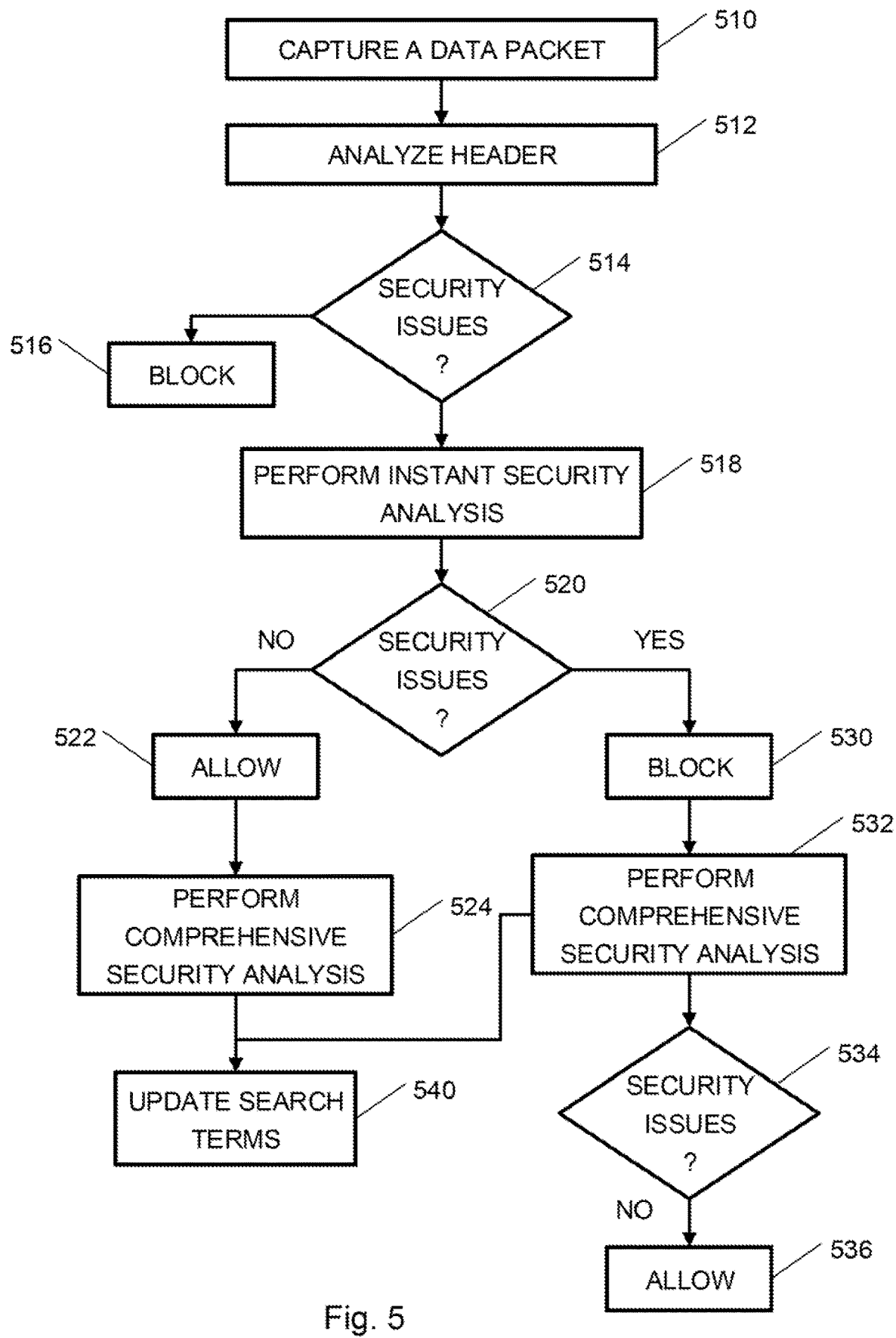
FIG. 5 is a flowchart of a method for classifying data in real-time for data streaming, according to embodiments of the invention.

Reference is made to FIG. 5, which is a flowchart of a method for classifying data in real-time for data streaming, according to embodiments of the invention. An embodiment of a method for classifying data in real-time for data streaming may be performed, for example, by the systems shown in FIGS. 1, 2 and 6. The method for classifying data in real-time for data streaming may be repeated for a plurality of data packets flowing between a data source machine and a data client.

In operation 510, a data packet (such as data packet 350) may be captured. The data packet may include a header and a query sent to a database by a data client or a response of the database to a query. For example, an agent software located at the data source machine (the data base server or a proxy or network gate of the database server) may capture the data packet. In operation 512, the data packet may be decrypted to obtain a header of the data packet, and the header may be analyzed to determine a security status of the data packet, e.g., by applying header security rules on the header data. In operation 514 it may be determined, based on the security status, as disclosed herein, whether the data packet should be blocked, as indicated in operation 516, or whether further security analysis is required, as indicated in operation 518. In operation 518, the data packet may undergo an instant security analysis as disclosed herein. According to some embodiments, instant security analysis may include searching the data packets for tokens, phrases, patterns and expressions associated with sensitive information, for example by performing searches a, b and c disclosed herein. The instant security analysis may be performed in real-time.

In operation 520, it may be determined based on the security issues found in the instant security analysis performed in operation 516 whether to allow (operation 522) or block (operation 530) the data packet. If no security issues were found in the instant security analysis, e.g., if tokens, phrases, patterns and expressions associated with sensitive information are not found in the data packet, then the data packet may be allowed as indicated in operation 522, e.g., the data packet may be allowed to flow between the data source machine and the data client. In operation 524, a comprehensive security analysis may be performed for the data packet. In some embodiments, the comprehensive security analysis may be performed in a remote location, e.g., in a security server and the data packet may be sent to the remote location for performing the comprehensive security analysis.

If however, no security issues were found in the instant security analysis (operation 518), e.g., if tokens, phrases, patterns and expressions associated with sensitive information were not found in the data packet, then the data packet may be blocked as indicated in operation 522, e.g., the data packet may be prevented from flowing between the data source machine and the data client. In operation 532, a comprehensive security analysis may be performed for the data packet, similarly to operation 524. In operation 534, it may be determined whether security issues were found in the comprehensive security analysis (operation 532). If security issues were not found in the comprehensive security analysis, then the data packet that was previously blocked based on the instant security analysis (operation 530) may be released or allowed to flow between the data source machine and the data client.

In operation 540, the tokens or search terms associated with sensitive information may be updated based on results of the comprehensive security analysis. For example, if security issues were found in the instant security analysis (operation 518), but no security issues were found in the comprehensive security analysis (operation 532), then the search terms that invoked the security issues in the instant security analysis may be removed from the searched terms. However, if security issues were not found in the instant security analysis (operation 518), but security issues were found in the comprehensive security analysis (operation 524), then the search terms that invoked the security issues in the comprehensive security analysis may be added to the searched terms.

FIG. 6 illustrates an example computing device according to an embodiment of the invention. Various components such as database client 310, security server 330 database servers 410 and 420, gateway or proxy 422 and other modules, may be or include computing device 700, or may include components such as shown in FIG. 5. For example, a first computing device 700 with a first processor 705 may be used to classify data in real-time for data streaming, according to embodiments of the invention.

Computing device 700 may include a processor 705 that may be, for example, a central processing unit processor (CPU), a chip or any suitable computing or computational device, an operating system 715, a memory 720, a storage 730, input devices 735 and output devices 740. Processor 705 may be or include one or more processors, etc., co-located or distributed. Computing device 700 may be for example a workstation or personal computer, or may be at least partially implemented by one or more remote servers (e.g., in the "cloud"). For example, computing device 700 may be included in cloud computing environment 50 depicted in FIGS. 1 and 2.

Operating system 715 may be or may include any code segment designed and/or configured to perform tasks involving coordination, scheduling, arbitration, supervising, controlling or otherwise managing operation of computing device 700, for example. Operating system 715 may be a commercial operating system. Operating system 715 may be or may include any code segment designed and/or configured to provide a virtual machine, e.g., an emulation of a computer system. Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality of, possibly different memory units.

Executable code 725 may be any executable code, e.g., an application, a program, a process, task or script. Executable code 725 may be executed by processor 705 possibly under control of operating system 715. For example, executable code 725 may be or include software for classifying data in real-time for data streaming, according to embodiments of the invention. In some embodiments, more than one computing device 700 may be used. For example, a plurality of computing devices that include components similar to those included in computing device 700 may be connected to a network and used as a system.

Storage 730 may be or may include, for example, a hard disk drive, a floppy disk drive, a Compact Disk (CD) drive, a CD-Recordable (CD-R) drive, a universal serial bus (USB) device or other suitable removable and/or fixed storage unit. Storage 730 may include or may store one or more databases including database 326, In some embodiments, some of the components shown in FIG. 6 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 740 may include one or more displays, speakers and/or any other suitable output devices. It will be recognized that any suitable number of output devices may be operatively connected to computing device 700 as shown by block 740. Any applicable input/output (I/O) devices may be connected to computing device 700 as shown by blocks 735 and 740. For example, a wired or wireless network interface card (NIC), a modem, printer or facsimile machine, a universal serial bus (USB) device or external hard drive may be included in input devices 735 and/or output devices 740. Network interface 750 may enable device 700 to communicate with one or more other computers or networks. For example, network interface 750 may include a Wi-Fi or Bluetooth device or connection, a connection to an intranet or the internet, an antenna etc.

Embodiments described in this disclosure may include the use of a special purpose or general-purpose computer including various computer hardware or software modules, as discussed in greater detail below.

Embodiments within the scope of this disclosure also include computer-readable media, or non-transitory computer storage medium, for carrying or having computer-executable instructions or data structures stored thereon. The instructions when executed may cause the processor to carry out embodiments of the invention. Such computer-readable media, or computer storage medium, can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general-purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computer" may be any computing system as previously defined herein, or any module or combination of modulates running on a computing system.

For the processes and/or methods disclosed, the functions performed in the processes and methods may be implemented in differing order as may be indicated by context. Furthermore, the outlined steps and operations are only provided as examples, and some of the steps and operations may be optional, combined into fewer steps and operations, or expanded into additional steps and operations.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method for classifying data in real-time, the method comprising:
   capturing a plurality of data packets flowing between a data source machine and a data client;
   searching a header of at least one of the data packets for metadata to determine whether the data packet should be allowed or should be further analyzed, wherein the metadata includes at least one of machine information, network information, user information, and client information;
   if the search of the header indicates that the at least one data packet should be further analyzed, searching raw data of a payload of the at least one of the data packets for tokens, values, expressions, words or phrases associated with sensitive information streaming in or out of a database in real-time without parsing the data packets or knowing which values in the payload fit into each field;
   if, during the searching of the raw data of the payload, the tokens, values, expressions, words or phrases associated with sensitive information are not found in the payload of a data packet:
      allowing the data packet to flow between the data source machine and the data client and sending a copy of the data packet to an offline comprehensive security analysis;
   if, during the searching of the raw data of the payload, tokens, values, expressions, words or phrases associated with sensitive information are found in the data packet:
      performing a wildcard search, a dictionary search, and a regular expression search of the payload in parallel in parallel for identified terms; and
      if identified terms are detected, preventing the data packet from flowing between the data source machine and the data client and sending the data packet or a copy of the data packet along with results from the searching of the raw data of the payload, to the offline comprehensive security analysis.

2. The method of claim 1, wherein if tokens, values, expressions, words or phrases associated with sensitive information are found in the data packet during the searching of the raw data of the payload the method further comprises:
   permanently blocking the data packet from flowing between the data source machine and the data client or discarding the data packet, if the offline comprehensive security analysis finds security issues; and
   allowing the data packet to flow between the data source machine and the data client if the offline comprehensive security analysis finds no security issues.

3. The method of claim 1, further comprising:
   enhancing or adjusting classification rules used during the searches of the raw data of the payload of the at least one data packets based on the offline comprehensive security analysis wherein:
      if during the searching of the raw data tokens, values, expressions, words or phrases associated with the sensitive information was found and the offline comprehensive security analysis did not find the at least one packet to contain the sensitive information, then removing search terms from the classification rules that invoked during the searching of the raw data identification of the tokens, values, expressions, words or phrases as being associated with the sensitive information; and
      if during the searching of the raw data tokens, values, expressions, words or if during the searching of the raw data tokens, values, expressions, words or phrases associated with sensitive information was not found, but the offline comprehensive security analysis did identify the sensitive information within the at least one data packets, then adding search terms to the classification rules that invoked the offline comprehensive security analysis to identify the sensitive information.

4. The method of claim 1, wherein the data packet is one of:
   a query sent from the data client to the data source machine, and a response sent from the data source machine to the data client.

5. The method of claim 1, wherein capturing and searching are performed by a software agent that is installed on the data source machine.

6. The method of claim 5, wherein performing the offline comprehensive security analysis is performed by a dedicated security server, and wherein the data packet is sent to the dedicated security server for performing the offline comprehensive security analysis.

7. The method of claim 1, wherein searching the raw data of a payload of the at least one of the data packets for tokens, values, expressions, words or phrases associated with sensitive information streaming in or out of the database in real-time without parsing the data packets or knowing which values in the payload fit into each field further comprises:
   calculating a security score of the at least one of the data packets as a combination of findings from a regular expression search and a dictionary search, wherein the regular expression search and the dictionary search are associated with a weight and the security score is calculated as a function of the weights and if the security score is above a threshold, the data packet is identified as having sensitive information.

8. The method of claim 1, wherein the offline comprehensive security analysis comprises:
   parsing the data packet;
   mapping metadata to data;
   building hierarchy of the data; and
   processing policy rules.

9. The method of claim 1, comprising:
   issuing a security alert if tokens, values, expressions, words or phrases associated with sensitive information are found in the data packet and the offline comprehensive security analysis finds security issues.

10. The method of claim 1, comprising:
    after capturing, decrypting the plurality of data packets to obtain a header of each packet;
    analyzing the headers to determine security status of packets associated with the headers; and
    selecting the at least one data packet based on the security status.

11. A system for classifying data in real-time, the system comprising:
    a memory; and
    a processor configured to:
       capture a plurality of data packets flowing between a data source machine and a data client;

search a header of at least one of the data packets for metadata to determine whether the data packet should be allowed or should be further analyzed, wherein the metadata includes at least one of machine information, network information, user information, and client information;

if the search of the header indicates that the at least one data packet should be further analyzed, search raw data of a payload of the at least one of the data packets for tokens associated with sensitive information streaming in or out of a database in real-time without parsing the data packets or knowing which values in the payload fit into each field;

if, during the searching of the raw data of the payload, the tokens, values, expressions, words or phrases associated with sensitive information are not found in the payload of a data packet:
  allow the data packet to flow between the data source machine and the data client and send a copy of the data packet to an offline comprehensive security analysis;

if, during the searching of the raw data of the payload, tokens, values, expressions, words or phrases associated with sensitive information are found in the data packet:
  perform a wildcard search, a dictionary search, and a regular expression search of the payload in parallel in parallel for identified terms; and
  if identified terms are detected, prevent the data packet from flowing between the data source machine and the data client and send the data packet or a copy of the data packet, along with results from the searching of the raw data of the payload, to the offline comprehensive security analysis.

12. The system of claim 11, wherein if tokens, values, expressions, words or phrases associated with sensitive information are found in the data packet during the searching of the raw data of the payload, the processor is configured to:
  permanently block the data packet from flowing between the data source machine and the data client or discard the data packet, if the offline comprehensive security analysis finds security issues; and
  allow the data packet to flow between the data source machine and the data client if the offline comprehensive security analysis finds no security issues.

13. The system of claim 11, wherein the processor is further configured to:
  enhance or adjust classification rules used during the searches of the raw data of the payload of the at least one data packets based on the offline comprehensive security analysis wherein:
    if during the search of the raw data tokens, values, expressions, words or phrases associated with the sensitive information was found and the offline comprehensive security analysis did not find the at least one packet to contain the sensitive information, then removing search terms from the classification rules that invoked during the searching of the raw data identification of the tokens, values, expressions, words or phrases as being associated with the sensitive information; and
    if during the search of the raw data tokens, values, expressions, words or phrases associated with sensitive information was not found but the offline comprehensive security analysis did identify the sensitive information within the at least one data packets, then adding search terms to the classification rules that invoked the offline comprehensive security analysis to identify the sensitive information.

14. The system of claim 11, wherein the data packet is one of: a query sent from the data client to the data source machine, and a response sent from the data source machine to the data client.

15. The system of claim 11, wherein that the processor is installed on the data source machine, and wherein performing the offline comprehensive security analysis is performed by a dedicated security server, and wherein the processor is configured to send the data packet to the dedicated security server for performing the offline comprehensive security analysis.

16. The system of claim 11, wherein the search of the raw data of a payload of the at least one of the data packets for tokens, values, expressions, words or phrases associated with sensitive information streaming in or out of the database in real-time without parsing the data packets or knowing which values in the payload fit into each field further causes the processor to:
  calculate a security score of the at least one of the data packets as a combination of findings from a regular expression search and a dictionary search, wherein the regular expression search and the dictionary search are associated with a weight and the security score is calculated as a function of the weights and if the security score is above a threshold, the data packet is identified as having sensitive information.

17. The system of claim 11, wherein the processor is configured to:
  issue a security alert if tokens, values, expressions, words or phrases associated with sensitive information are found in the data packet and the offline comprehensive security analysis finds security issues, wherein the offline comprehensive security analysis comprises:
  parsing the data packet;
  mapping metadata to data;
  building hierarchy of the data; and
  processing policy rules.

18. A computer program product for classifying data in real-time, the computer program product comprising:
  one or more non-transitory computer readable storage media having computer-readable program instructions stored on the one or more computer readable storage media, said program instructions executes a computer-implemented method comprising:
    capturing a plurality of data packets flowing between a data source machine and a data client;
    searching a header of at least one of the data packets for metadata to determine whether the data packet should be allowed or should be further analyzed, wherein the metadata includes at least one of machine information, network information, user information, and client information;
    if the search of the header indicates that the at least one data packet should be further analyzed, searching raw data of a payload of at least one of the data packets for tokens, values, expressions, words or phrases associated with sensitive information streaming in or out of a database in real-time without parsing the data packets or knowing which values in the payload fit into each field;
    if, during the searching of the raw data of the payload, the tokens, values, expressions, words or phrases associated with sensitive information are not found in the payload of a data packet:

allowing the data packet to flow between the data source machine and the data client and sending a copy of the data packet to an offline comprehensive security analysis;

if, during the searching of the raw data of the payload, tokens, values, expressions, words or phrases associated with sensitive information are found in the data packet:

performing a wildcard search, a dictionary search, and a regular expression search of the payload in parallel in parallel for identified terms; and if identified terms are detected, preventing the data packet from flowing between the data source machine and the data client and sending the data packet or a copy of the data packet, along with results from the searching of the raw data of the payload, to the offline comprehensive security analysis.

* * * * *